United States Patent [19]

De Luca

[11] 4,122,313
[45] Oct. 24, 1978

[54] TELEPHONE CONNECTOR CUTOVER BLOCK

[75] Inventor: Paul V. De Luca, Port Washington, N.Y.

[73] Assignee: Porta Systems Corp., Syosset, N.Y.

[21] Appl. No.: 803,680

[22] Filed: Jun. 6, 1977

[51] Int. Cl.² .............................................. H05K 1/07
[52] U.S. Cl. ................... 179/98; 179/1 PC; 339/32 R; 361/412
[58] Field of Search .................. 179/98, 1 PC, 91 R; 361/397, 409, 410, 412, 413, 415; 339/17 R, 17 M, 32 R, 32 M; 200/292

[56] References Cited

U.S. PATENT DOCUMENTS

| | | | |
|---|---|---|---|
| 2,849,700 | 8/1958 | Perkin | 179/98 |
| 3,231,767 | 1/1966 | Powell | 339/32 M |
| 3,300,750 | 1/1967 | Harner et al. | 339/32 R |
| 3,641,475 | 2/1972 | Irish et al. | 179/98 |
| 3,838,315 | 9/1974 | Wilbourn | 361/412 |
| 4,017,768 | 4/1977 | Valfre | 179/98 |
| 4,035,587 | 7/1977 | Undhjem et al. | 179/98 |

Primary Examiner—Kathleen H. Claffy
Assistant Examiner—Gerald L. Brigance
Attorney, Agent, or Firm—Charles E. Temko

[57] ABSTRACT

An improved cutover block enabling a plurality of telephone circuits to be conveniently transferred from one switching location to another switching location. The cutover operation is performed manually by disconnecting a printed circuit board carried by the cutover block, rotating the board about 180° on its own axis, and reconnecting it to the cutover block to result in reconnecting the circuit to another location. For convenience, the cutover block is made to the same dimensions as a standard telephone connector block, so that it may be mounted conveniently on a frame adjacent an existing connector block with which it is associated.

4 Claims, 6 Drawing Figures

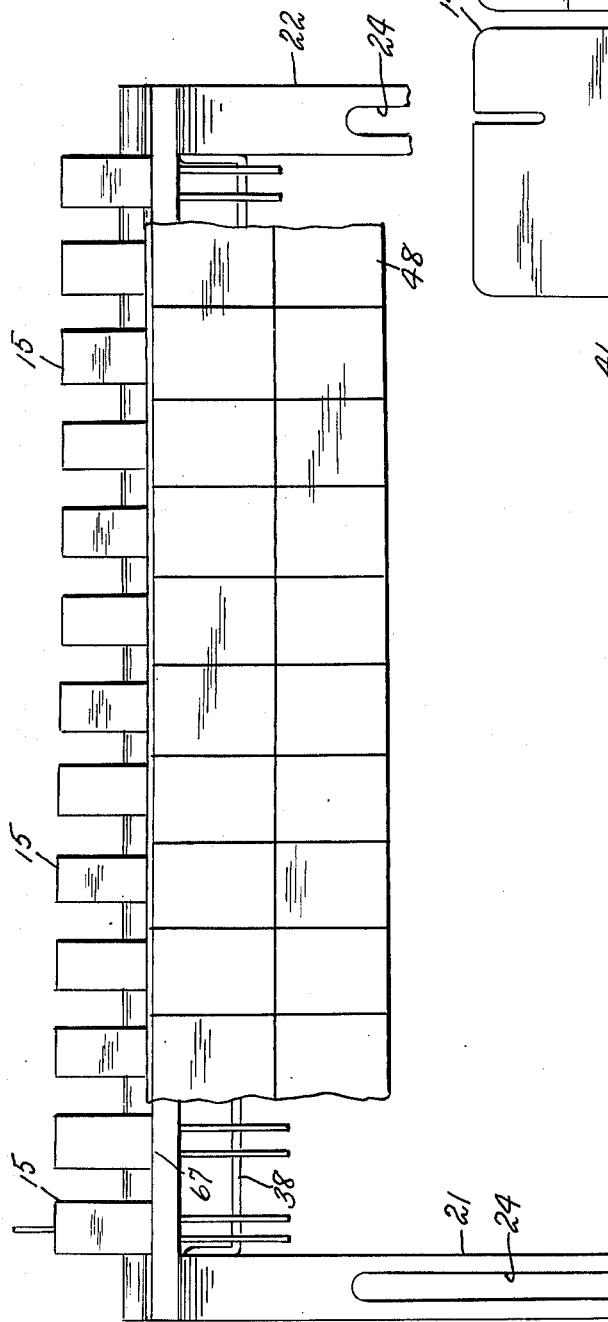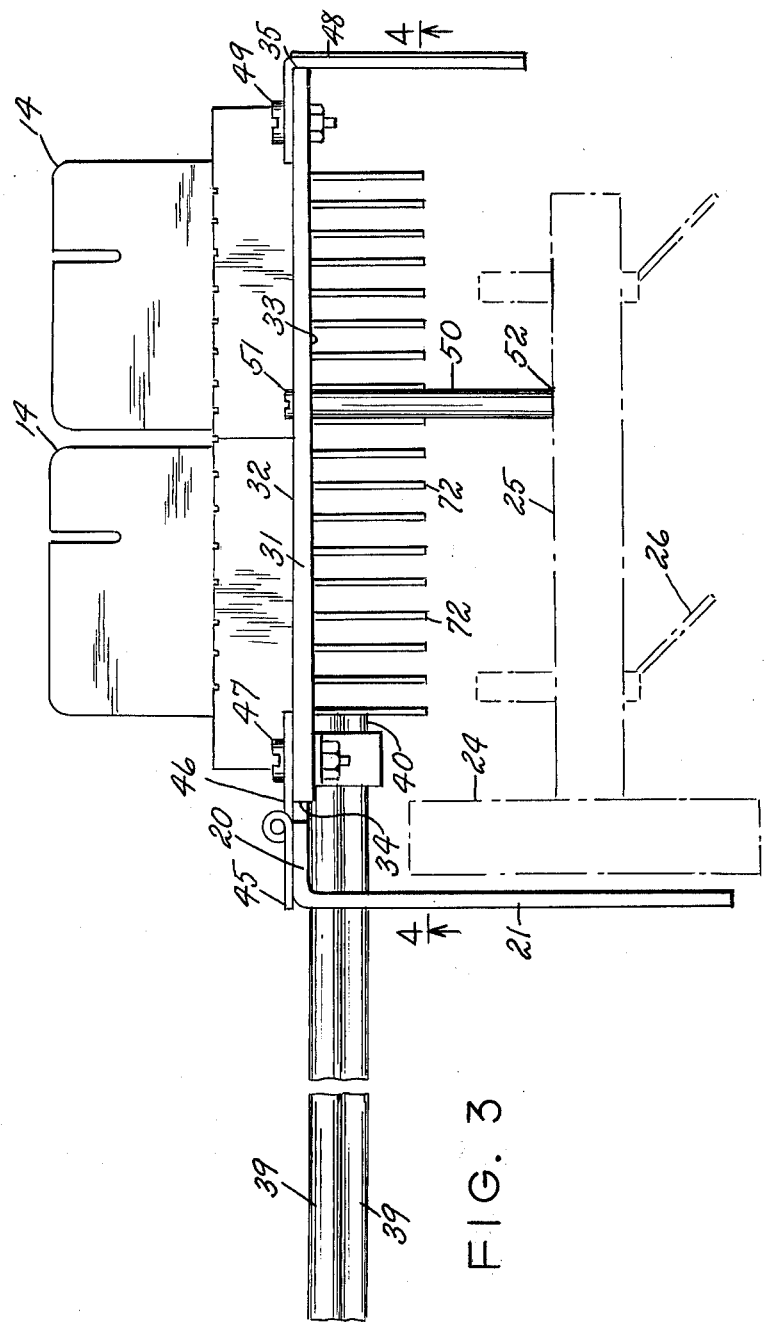

TELEPHONE CONNECTOR CUTOVER BLOCK

BACKGROUND OF THE INVENTION

This invention relates generally to the field of telephony, and more particularly to an improved device enabling the transfer of switching operations for individual circuits from a first location to a second location without more than momentary interruption of service to an individual subscriber.

The problem of transferring switching operations for existing telephone circuits is a continuous one. With constant growth of the number of subscribers in a given area, the limit of physical capacity of an existing telephone office is often reached within a few years of the date of initial operation. Very often it is not possible, or economically feasible, to expand existing facilities, and to provide for additional subscriber circuits, an entirely new office is constructed at a new location with the intention that switching functions for some if not all of the circuits previously served at the old location will be transferred to the new location. Since the transfer, if accomplished on an individual circuit-by-circuit basis will result in substantial interruption of service, it is desirable, ideally, to accomplish the changeover on a substantially instantaneous basis in which large blocks of subscriber circuits are transferred simultaneously.

In U.S. Pat. No. 3,872,259 granted Mar. 22, 1977, and assigned to the same assignee as the instant application, there is disclosed a device for accomplishing the transfer of large blocks of circuits instantaneously, using electronic elements. Once the transfer has been effected, the device may be disconnected and reused for a similar function, and where large numbers of such transfers in a given geographic area are required over a relatively short period of time, the cost of such devices may be readily justified.

However, in many areas of relatively lesser population density, the problem arises on a smaller scale, and a reusable device of lesser complexity will accomplish an equivalent result at correspondingly less cost.

SUMMARY OF THE INVENTION

Briefly stated, the invention contemplates the provision of an improved cutover device which may be associated with an individual telephone connector block to permit interconnection of affected telephone subscriber circuits in a selective manner to the switching equipment at old and new locations, the cutover being accomplished manually by disconnecting a printed circuit board on a cutover block, rotating the same about a longitudinal axis through 180°, and reconnecting the printed circuit board to the cutover block, the circuitry on opposing surfaces of the board being such that with reconnection, the individual subscriber circuit is changed from communication with existing switching equipment to new switching equipment at a different location. The device contains a large number of such boards, each accommodating an individual circuit, so that blocks of such circuits may be changed over within a relatively short time interval.

BRIEF DESCRIPTION OF THE DRAWINGS

In the drawings, to which reference will be made in the specification, similar reference characters have been employed to designate corresponding parts throughout the several views.

FIG. 2 is a fragmentary front elevational view thereof.

FIG. 3 is a side elevational view thereof.

DETAILED DESCRIPTION OF THE DISCLOSED EMBODIMENT

Figure 5:
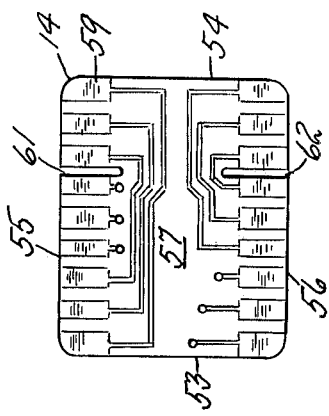
FIG. 5 is a view in elevation of an individual printed circuit board forming a part of the disclosed embodiment.
Figure 6:
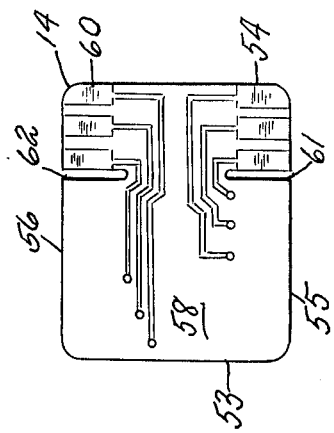
FIG. 6 is a second view in elevation of a circuit board showing the side opposite that seen in FIG. 5.
Figure 1:
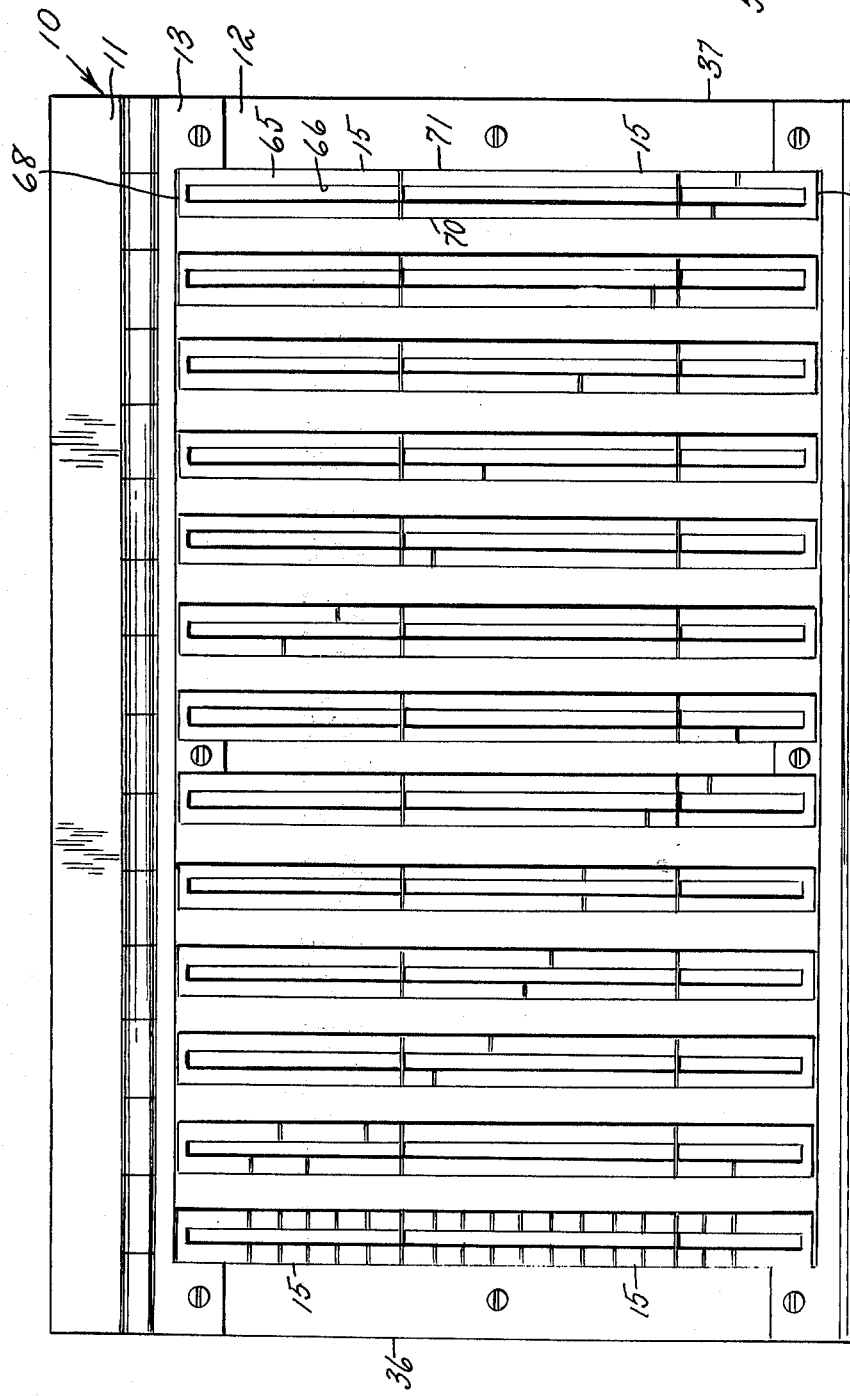
FIG. 1 is a top plan view of an embodiment of the invention.

In accordance with the invention, the device, generally indicated by reference character 10, comprises broadly: a fixed frame element 11, a pivoted frame element 12, hinge means 13 interconnecting elements 11 and 12, a plurality of individual circuit boards 14, a corresponding plurality of circuit board engaging means 15, and first, second and third pluralities of terminals 17, 18 and 19, respectively, associated with each circuit card engaging means 15.

The fixed frame element 11 provides means for mounting the device upon an existing standard telephone frame. It includes a horizontal base member 20, and first and second vertical members 21 and 22, respectively, each having elongated slots 24 for attachment by screws (not shown). The frame element 24 mounts a plurality of existing terminal connector blocks 25, the connections of which are to be transferred from its terminal pins 26 from one switching location to another by means of the device 10.

The pivoted frame element 12 includes a main wall member 31 having an upper surface 32 and a lower surface 33 which are bounded by an inner edge 34, an outer edge 35 and side edges 36 and 37. A cable clamp 38 mounts a plurality of short lengths of fixed wire cable 39, a first end 40 of each cable being connected to the first plurality of terminal 17, and a second end connectable to the terminal pins 26. These terminals represent so-called "common" conductors which are connected to those pins on the existing terminal block which communicate with incoming subscriber lines, and which will continue to conduct after the changeover operation has been accomplished.

The hinge means 13 may be conventional, including a first portion 45 which is welded to the fixed frame element 11, and a second member which is secured by screws 47 to the pivoted frame element 12, the screws serving a dual function of maintaining the cable clamp 38 in position. Mounted adjacent the outer edge 35 is a cisplay panel 48 held by screws 49 permitting the identification of individual subscriber circuits carried by the device. A positioning stud 50 is held in position by a screw 51, and includes a lower end 52 which rests upon the existing terminal connector block to maintain the device 10 normally in readily accessible horizontal position, while permitting pivoting about the hinge means to facilitate wiring operations.

The individual circuit boards 14 are substantially similar, each being of generally rectangular configuration and bounded by first and second end edges 53 and 54, respectively; first and second side edges 55 and 56, respectively; and first and second planar surfaces 57 and 58, respectively; each surface having a printed circuit 59 and 60 thereon which establishes electrical communication between the terminals 17–19, inclusive, in a selective fashion, as will more fully appear. To prevent the circuit boards from being engaged with the engaging means 15 in other than either of two orientations, keying slots 61 and 62 are provided, thus assuring that rotation during cutover occurs about a horizontal axis, as seen in FIG. 3.

The engaging means 15 are generally similar, each being of elongated configuration and bounded by an upper surface 65 having an elongated recess 66, the configuration of which accomodates an individual circuit board, a lower surface 67 mounted on the main wall 31, end surfaces 68 and 69 and side surfaces 70 and 71. A plurality of wire wrap pins 72 extend downwardly therefrom, the upper ends of which engage conductors on the printed circuits 59 or 60 in a selective manner, and the lower ends of which are wired to corresponding terminals on the associated existing terminal block 25.

Figure 4:
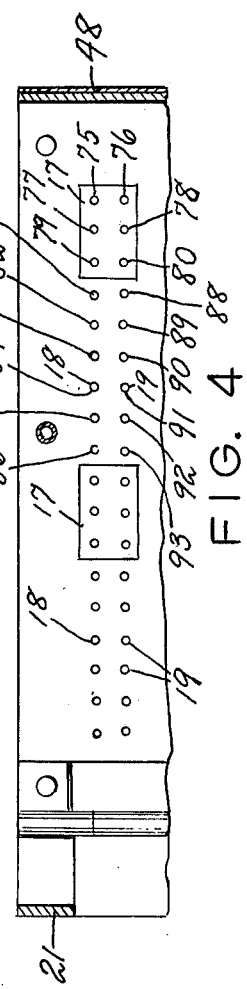
FIG. 4 is a schematic fragmentary sectional view thereof showing a typical wiring arrangement.

FIG. 4 illustrates a typical wiring arrangement associated with the pins 72, including a plurality of so-called "common" terminals 75, 76, 77, 78, 79, 80 which remain connected irrespective of the orientation of the circuit board and comprise the plurality of terminals 17. The second plurality of terminals 18 include terminals 81 through 86, which will be contacted only in one of the two orientations of the corresponding circuit board, while the third plurality 19 includes terminals 88 through 93, inclusive, which will be contacted in the other orientation of the circuit board.

During installation of new switching equipment, leads will be established between the existing terminal block 25 and the device 10 to the first plurality of terminals 17. The existing wiring equipment will be connected to the second plurality of terminals 18, and the corresponding circuit board will be placed in a first of two orientations within the engaging means 15, so that normal service will be continued using the existing switching equipment (not shown). A large number of circuits are similarly wired.

When the new switching equipment is ready to accept calls, the circuit boards are individually manually disconnected from the engaging means 15 and rotated about a horizontal axis as seen in FIG. 3 following which they are reinserted into the means 15, to effectively disconnect the second plurality of terminals 18 and connect the third plurality of terminals 19, so that current will flow to the new switching equipment. Since the time required to complete this manual operation is seldom more than a few seconds, no individual subscriber will be deprived of service for more than that period of time, although the entire reconnection, which involves the manual manipulation of each circuit board will require a considerably longer period of time. The device 10 may be allowed to remain in position, until permanent connections to the new switching equipment can be made, following which the device may be disconnected, and again reused for the same purpose.

I wish it to be understood that I do not consider the invention limited to the precise details of structure shown and set forth in this specification, for obvious modifications will occur to those skilled in the art to which the invention pertains.

I claim:

1. An auxiliary telephone connector block for use in changing the connection of individual telephone subscriber circuits from one switching equipment location to another switching equipment location, said block comprising: a generally planar frame element including a main wall, a plurality of elongated circuit board engaging means mounted upon a surface of said main wall, a corresponding plurality of planar circuit boards, each having first and second oppositely disposed surfaces, each of said first and second surfaces having differing circuits thereon; said circuit boards being selectively engaged in either of two orientations relative to a respective circuit board engaging means; first, second and third pluralities of terminals carried by said main wall adjacent each of said circuit board engaging means in such positions as to establish electrical communication with corresponding terminals on said circuit boards upon the engagement thereof; the circuits on said first and second surfaces of each of said circuit boards being so configured as to establish communication between said first and second pluralities of terminals when engaged in one of said orientations, and establish communication between said first and third pluralities of terminals when in the other of said orientations.

2. A connector block in accordance with claim 1, further characterized in the provision of hinged means for interconnecting said main wall to a telephone frame element in proximity to an existing telephone connector block.

3. A connector block in accordance with claim 2, including positioning stud means mounted upon and extending laterally from the plane of said main wall, said stud means being adapted to contact a surface of an existing telephone connector block to position the pivotal orientation of said first mentioned connector block.

4. A connector block in accordance with claim 1, further characterized in said printed circuit boards being provided with keying means to prevent engagement with said circuit block engaging means in other than said two orientations.

* * * * *